United States Patent
Yasuda et al.

(10) Patent No.: US 8,718,332 B2
(45) Date of Patent: May 6, 2014

(54) APPARATUS AND METHOD FOR ANALYZING THE PERFORMANCE LEVEL OF OVERPRINTING

(75) Inventors: Takuya Yasuda, Kyoto (JP); Atsushi Imamura, Kyoto (JP)

(73) Assignee: Dainippon Screen Mfg. Co., Ltd., Kyoto (JP)

( * ) Notice: Subject to any disclaimer, the term of this patent is extended or adjusted under 35 U.S.C. 154(b) by 770 days.

(21) Appl. No.: 12/892,071

(22) Filed: Sep. 28, 2010

(65) Prior Publication Data

US 2011/0075890 A1 Mar. 31, 2011

(30) Foreign Application Priority Data

Sep. 28, 2009 (JP) ................................ 2009-222848

(51) Int. Cl.
*G06K 9/00* (2006.01)

(52) U.S. Cl.
USPC ........................................................ 382/112

(58) Field of Classification Search
None
See application file for complete search history.

(56) References Cited

U.S. PATENT DOCUMENTS

| 2002/0106128 | A1 | 8/2002 | Zlotnick | |
| 2008/0232674 | A1* | 9/2008 | Sakai et al. | 382/149 |
| 2008/0252791 | A1 | 10/2008 | Mitsunaga | |
| 2011/0043864 | A1* | 2/2011 | Tian et al. | 358/3.26 |
| 2013/0114855 | A1* | 5/2013 | Kane et al. | 382/103 |

FOREIGN PATENT DOCUMENTS

| EP | 0411231 | A2 | 2/1991 | |
| JP | H11-031228 | | 2/1999 | |
| JP | 11-078183 | | 3/1999 | |
| JP | 2003-054096 | | 2/2003 | |
| JP | 2005-043235 | | 2/2005 | |
| JP | 2005-205853 | A | 8/2005 | |
| JP | 2005205853 | A * | 8/2005 | ............... B41J 29/46 |
| JP | 4127326 | | 5/2008 | |
| JP | 2008-263475 | A | 10/2008 | |
| WO | WO 00/048127 | | 8/2000 | |

OTHER PUBLICATIONS

European Search Report issued in European Patent Application No. 10173107.3-2218, mailed Jan. 24, 2011.
Fisher, R., et al., "Image Arithmetic—Pixel Division", 2003, Retrieved from the Internet: URL:http://homepages.inf.ed.ac.uk/rbf/HIPR2/pixdiv.html.
Japanese Office Action, and partial English translation thereof, issued in Japanese Patent Application No. 2009-222848 dated Feb. 12, 2013.
Extended European Search Report issued in European Application No. 10173107.3 dated Jul. 17, 2013.

* cited by examiner

*Primary Examiner* — Nirav G Patel
(74) *Attorney, Agent, or Firm* — McDermott Will & Emery LLP

(57) ABSTRACT

An image inspection apparatus includes a pre-printed element reduction section that reduces influence of a pre-printed element on inspection and generates an inspection object image, and a comparative inspection section that compares the inspection object image with the additionally-recorded data, to inspect a performance level of a result of overprinting. Captured image data of the pre-printed paper image and the overprinted image is given to the pre-printed element reduction section. By using the captured image data of the pre-printed paper image, the pre-printed element reduction section reduces the pre-printed element included in the captured image data of the overprinted image and newly prepares the inspection object image.

21 Claims, 9 Drawing Sheets

F I G . 2
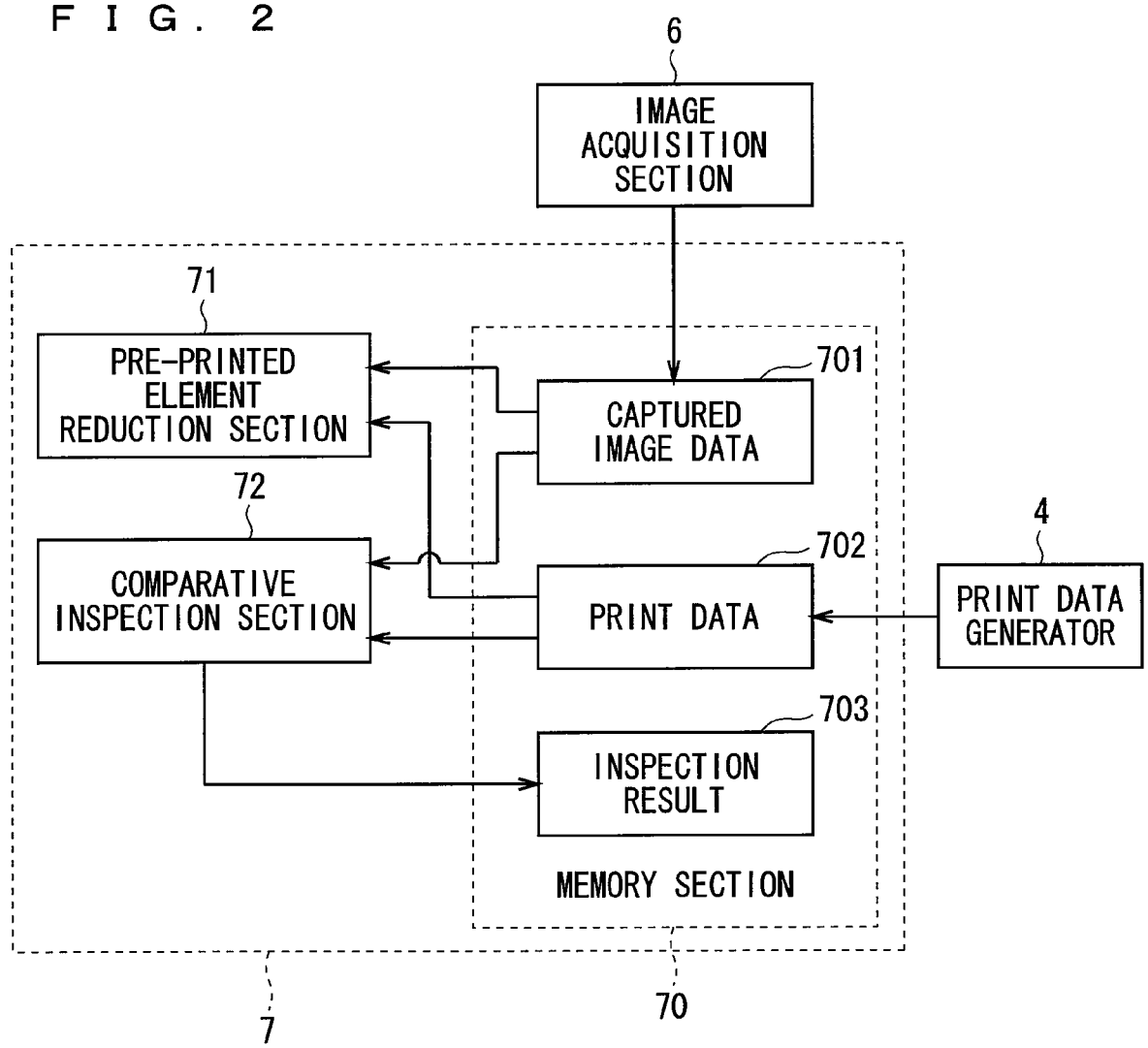

FIG. 4
(a) PRE-PRINTED PAPER IMAGE
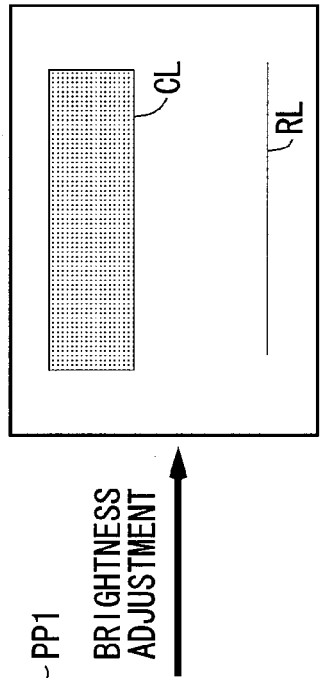
(b) BRIGHTNESS-ADJUSTED IMAGE
BRIGHTNESS ADJUSTMENT
(c) OVERPRINTED IMAGE
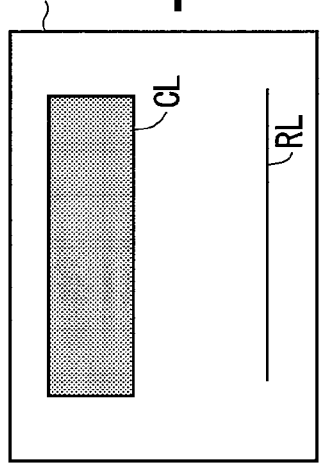
OVERPRINTED IMAGE / ADJUSTED IMAGE
(d) QUOTIENT IN EACH PIXEL
MULTIPLY QUOTIENT VALUES OF ENTIRE IMAGE BY BRIGHTNESS VALUE OF BASE PORTION
(e) INSPECTION OBJECT IMAGE
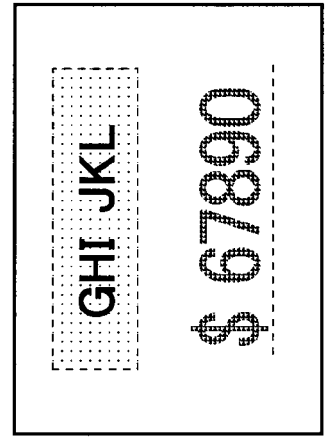

F I G . 5
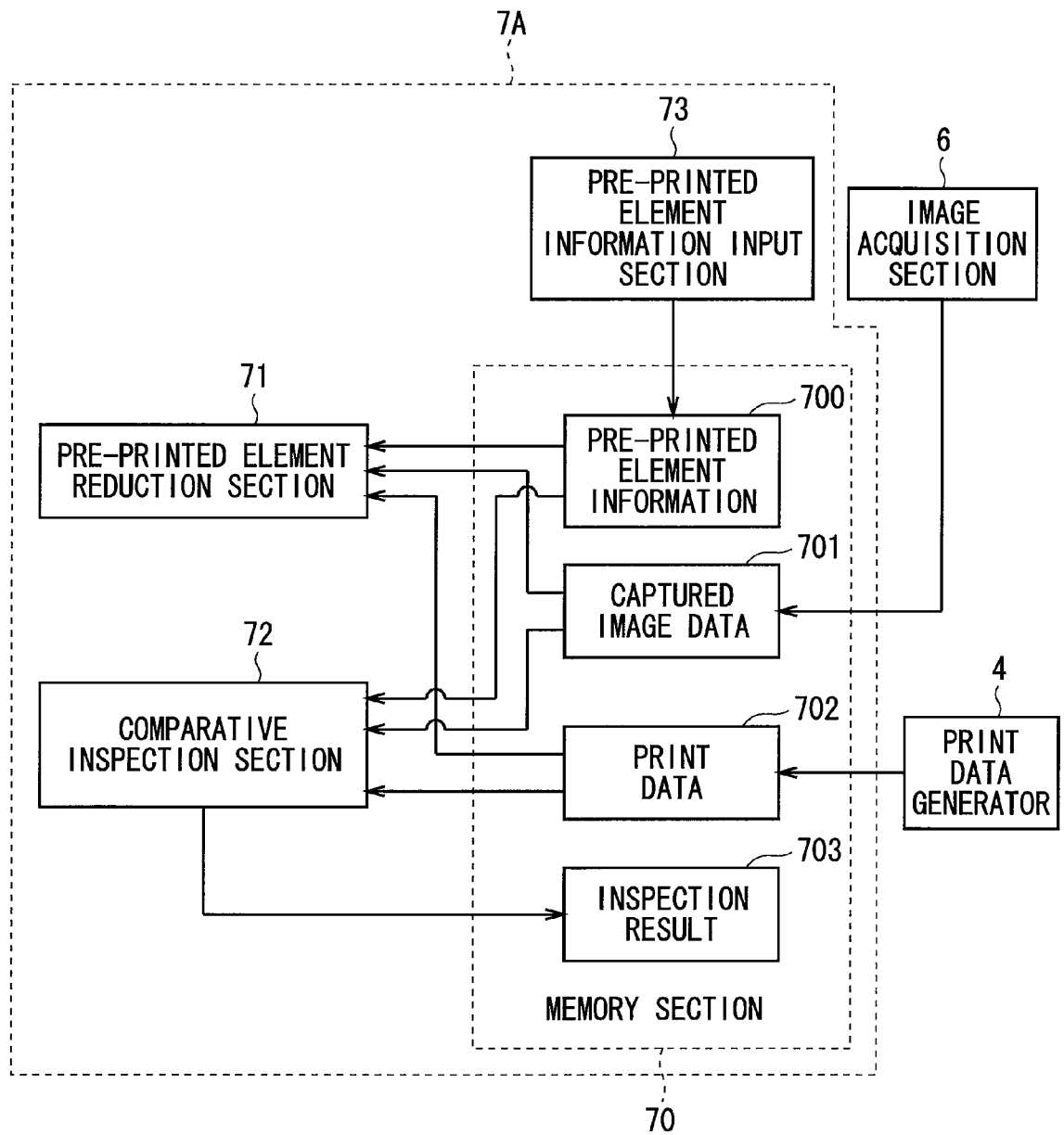

FIG. 7
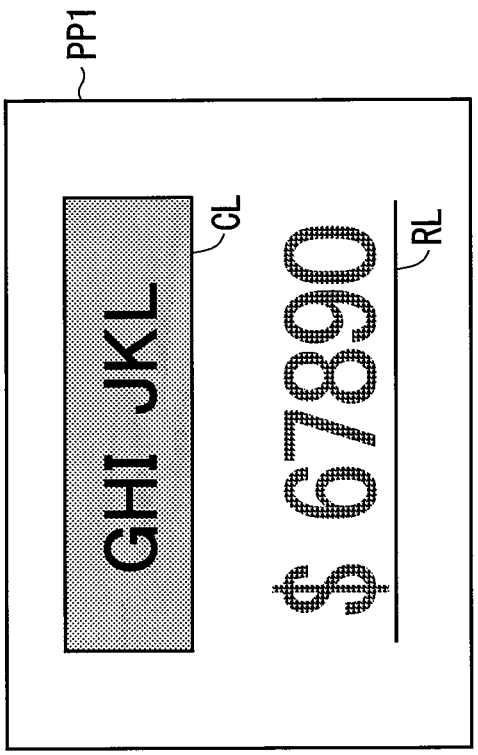
(b) AFTER OVERPRINTING
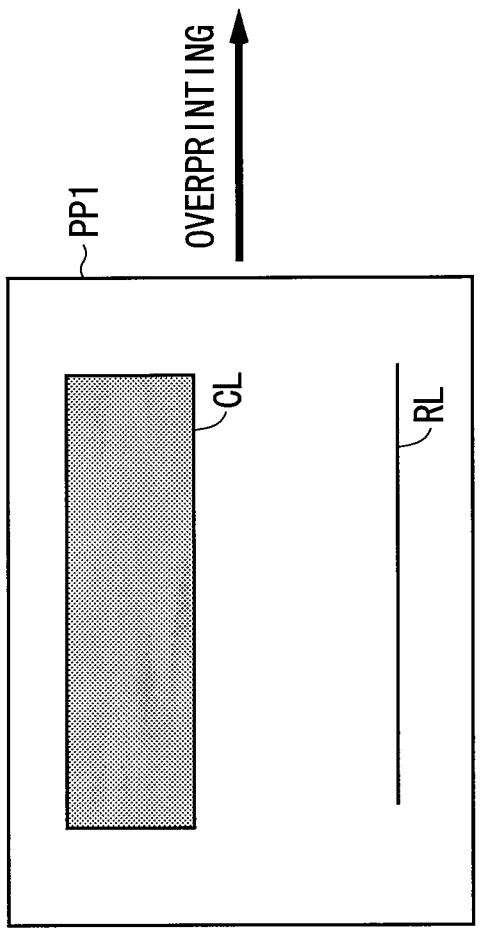
(a) PRE-PRINTED PAPER

APPARATUS AND METHOD FOR ANALYZING THE PERFORMANCE LEVEL OF OVERPRINTING

BACKGROUND OF THE INVENTION

1. Field of the Invention

The present invention relates to an image inspection apparatus, an image inspection method, and an image recording apparatus, and particularly relates to an image inspection apparatus and an image inspection method which inspect a printed image by using a captured image obtained by capturing an image of a printed material, and an image recording apparatus including the image inspection apparatus.

2. Description of the Background Art

A mode of performing overprinting by using a pre-printed paper, such as a slip paper and a detailed statement paper, on which a frame line and/or a ruled line is printed in advance, has been widely used so far.

For example, FIG. 6 shows an exemplary case where overprinting is performed on a pre-printed paper having a frame line and a ruled line printed thereon. The part (a) of FIG. 6 shows a pre-printed paper PP having a frame line CL and a ruled line RL printed thereon, and the part (b) of FIG. 6 shows an exemplary case where overprinting has been performed within the frame line CL and above the ruled line RL.

In recent years, there has been demanded not only simple printing such as overprinting a character, a barcode, and the like, on a paper having a ruled line and/or a frame line, but also highly flexible printing such as overprinting a multi-valued image exemplified by a photograph or an illustration on a pre-printed paper having a multi-valued image exemplified by a background or a pattern For example, the part (a) of FIG. 7 shows a pre-printed paper PP1 on which a ruled line RL, a frame line CL, and a background image within the frame line CL are printed, and the part (b) of FIG. 7 shows an exemplary case where overprinting has been performed within the frame line CL and above the ruled line RL.

In order to inspect a performance level of a result of such overprinting on the pre-printed paper, a method of capturing an image of the overprinted printing paper and inspecting the captured image is adopted. However, the captured image includes both a pre-printed element and an overprinted element, which causes a significant problem in an inspection process.

For example, when additionally-recorded data indicating the overprinted element and a captured image are compared with each other, the pre-printed element included in the captured image is a factor of an erroneous detection, which deteriorates an inspection accuracy.

FIG. 8 schematically shows such a case. The part (a) of FIG. 8 shows a captured image obtained by capturing an image of a printing paper on which overprinting is performed within the frame line CL and above the ruled line RL, and the part (b) of FIG. 8 shows additionally-recorded data for overprinting. When inspection is performed by comparing the captured image and the additionally-recorded data with each other, as shown in the part (c) of FIG. 8, the overprinted element included in the captured image data is not detected as a lack because the overprinted element coincides with the additionally-recorded data, but the frame line CL and the ruled line RL which are the pre-printed element included in the pre-printed paper PP are detected as a lack, a stain, or the like, because the pre-printed element does not coincide with the additionally-recorded data.

Therefore, it is necessary to reduce influence of the pre-printed element included in the captured image in some way.

To address the problem, for example, Japanese Patent No. 412736 discloses inspecting various printed materials after performing thereon an invalidation process in which a pre-printed element included in a captured image is substantially invalidated by using, as mask data, pre-printed element information which is prepared in advance.

However, the invalidation process is a mask process in which a mask image is prepared by setting a region where the pre-printed element exists to be 0 and a region where the pre-printed element does not exist to be 1, and a logical multiplication (AND operation) of the mask image and the captured image is performed. This method excludes all of regions where the pre-printed element exists from an inspection object. Thus, when there is a region where the overprinted element, a stain, a lack, or the like, overlaps the pre-printed element, such a region cannot be inspected, either. This raises a significant problem particularly when a pre-printed paper includes a pre-printed element such as a tint and a pattern as a background.

FIG. 9 schematically shows such a case. The part (a) of FIG. 9 shows a captured image of the pre-printed paper PP1 on which the ruled line RL, the frame line CL, and the background image within the frame line CL are printed, and the part (b) of FIG. 9 shows a mask image in which a region where the pre-printed element exists is masked based on the captured image of the pre-printed paper PP1. In the mask image, a region of the pre-printed element corresponding to the region within the frame line CL is a mask region M1, and a region of the pre-printed element corresponding to the ruled line RL is a mask region M2.

The part (c) of FIG. 9 shows a captured image obtained by capturing an image of the overprinted printing paper on which overprinting has been performed within the frame line CL and above the ruled line RL. The part (d) of FIG. 9 shows a result of the mask process being performed on the captured image by using the mask image shown in the part (b) of FIG. 9. In an example shown in the part (d) of FIG. 9, the mask region M1 excludes the region within the frame line CL from an inspection object, to make it impossible to inspect the overprinted element existing within the frame line CL.

SUMMARY OF THE INVENTION

The present invention is directed to an image inspection apparatus and an image inspection method which can cover a region where a pre-printed element exists as an inspection object to be inspected during image inspection of a result of overprinting performed on a pre-printed paper and which prevent an occurrence of a significant erroneous detection in an entire image, and also directed to an image recording apparatus including the image inspection apparatus.

According to an aspect of the present invention, an image inspection apparatus inspects a performance level of a result of overprinting in an overprinted paper obtained after an overprinted element is printed on a pre-printed paper having a pre-printed element printed thereon in advance. The image inspection apparatus includes a pre-printed element reduction section and a comparative inspection section. The pre-printed element reduction section performs an arithmetic process on image data of the pre-printed paper, which is obtained in advance, and image data of the overprinted paper, and generates an inspection object image in which the pre-printed element included in the image data of the overprinted paper is reduced. The comparative inspection section receives image data of the inspection object image outputted from the pre-printed element reduction section, and compares the image data of the inspection object image with the image data of the overprinted element, to thereby inspect the performance level of a result of overprinting.

As described above, by using the image data of the pre-printed paper, the pre-printed element included in the image data of the overprinted image is reduced, and the inspection object image is newly prepared. Then, the image data of the inspection object is compared with the image data of the overprinted element. Accordingly, unlike the conventional method, even when the overprinted element exists in a region where the pre-printed element exists, the region can be inspected without masking the region where the pre-printed element exists. Moreover, since the pre-printed element is reduced in the inspection object image, a significant erroneous detection can be prevented in the entire image.

According to another aspect of the present invention, an image inspection method inspects a performance level of a result of overprinting in an overprinted paper obtained after an overprinted element is printed on a pre-printed paper having a pre-printed element printed thereon in advance. The method includes the following steps of (a) and (b). In the step (a), an arithmetic process is performed on image data of the pre-printed paper, which is obtained in advance, and image data of the overprinted paper, and an inspection object image in which the pre-printed element included in the image data of the overprinted paper is reduced is generated. In the step (b), image data of the inspection object image is received, and the image data of the inspection object image is compared with the image data of the overprinted element, to thereby inspect the performance level of a result of overprinting.

As described above, by using the image data of the pre-printed paper, the pre-printed element included in the image data of the overprinted image is reduced, and the inspection object image is newly prepared. Then, the image data of the inspection object is compared with the image data of the overprinted element. Accordingly, unlike the conventional method, even when the overprinted element exists in a region where the pre-printed element exists, the region can be inspected without masking the region where the pre-printed element exists. Moreover, since the pre-printed element is reduced in the inspection object image, a significant erroneous detection can be prevented in the entire image.

According to still another aspect of the present invention, an image recording apparatus prints an overprinted element on a pre-printed paper having a pre-printed element printed thereon in advance. The image recording apparatus includes an image inspection apparatus which inspects a performance level of a result of overprinting in an overprinted paper obtained after the overprinted element is printed. The image inspection apparatus includes a pre-printed element reduction section and a comparative inspection section. The pre-printed element reduction section performs an arithmetic process on image data of the pre-printed paper, which is obtained in advance, and image data of the overprinted paper, and generates an inspection object image in which the pre-printed element included in the image data of the overprinted paper is reduced. The comparative inspection section receives image data of the inspection object image outputted from the pre-printed element reduction section, and compares the image data of the inspection object image with the image data of the overprinted element, to thereby inspect the performance level of a result of overprinting.

As described above, by using the image data of the pre-printed paper, the pre-printed element included in the image data of the overprinted image is reduced, and the inspection object image is newly prepared. Then, the image data of the inspection object is compared with the image data of the overprinted element. Accordingly, unlike the conventional method, even when the overprinted element exists in a region where the pre-printed element exists, the region can be inspected without masking the region where the pre-printed element exists. Moreover, since the pre-printed element is reduced in the inspection object image, a significant erroneous detection can be prevented in the entire image.

These and other objects, features, aspects and advantages of the present invention will become more apparent from the following detailed description of the present invention when taken in conjunction with the accompanying drawings.

BRIEF DESCRIPTION OF THE DRAWING

FIG. 2 is a block diagram showing a configuration of the image inspection apparatus according to the present invention.

FIG. 4 is a diagram illustrating an exemplary method for reducing the influence of the presence of the pre-printed element.

FIG. 5 is a block diagram showing a configuration of a modified example of the image inspection apparatus according to the present invention.

FIG. 7 is a diagram illustrating overprinting.

DESCRIPTION OF THE PREFERRED EMBODIMENTS

Preferred Embodiment

<Structure of Apparatus>

Figure 1:
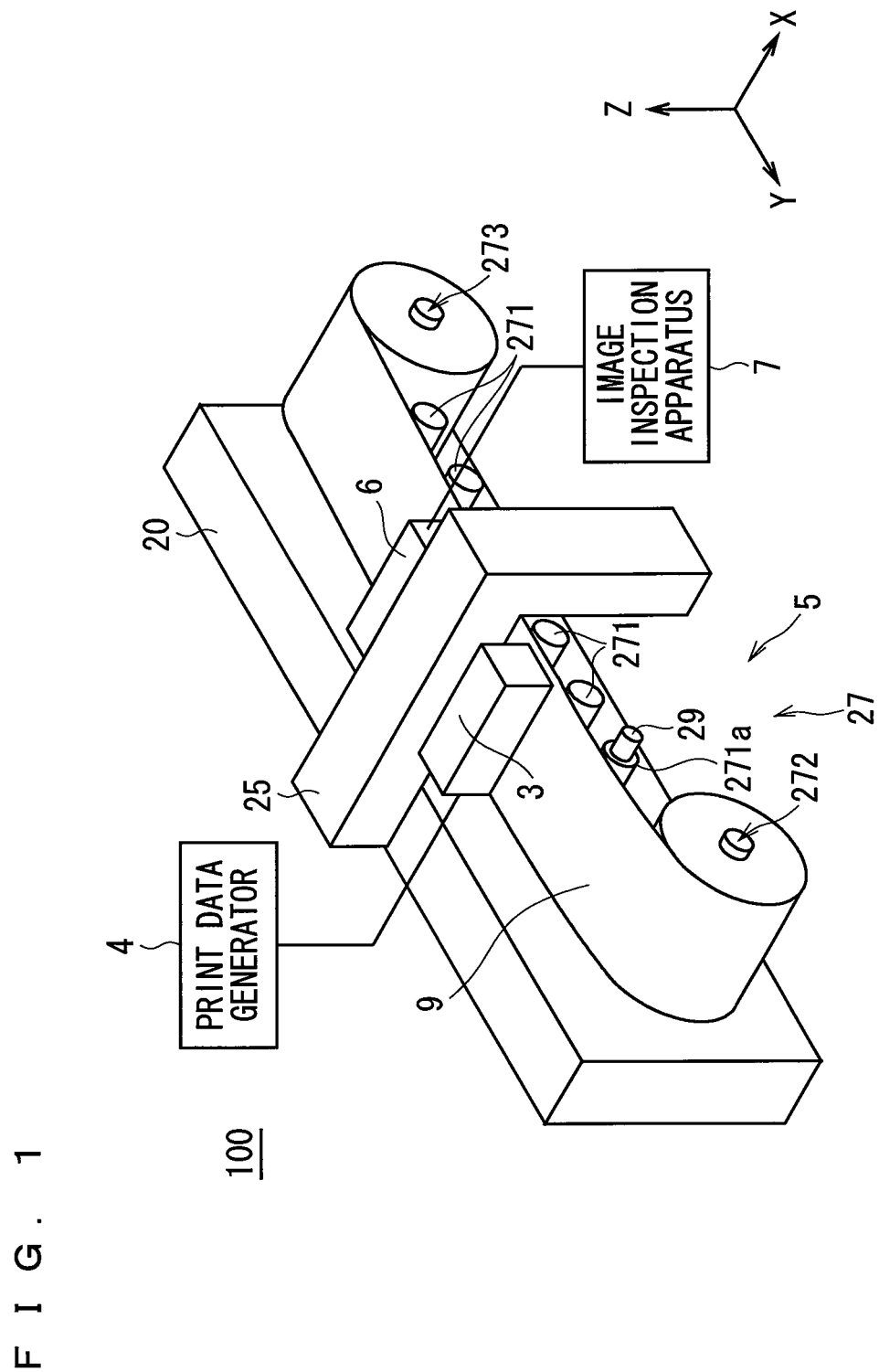
FIG. 1 is a perspective view showing a structure of an image recording apparatus including an image inspection apparatus according to the present invention.

FIG. 1 is a perspective view showing a structure of an image recording apparatus 100 including an image inspection apparatus according to the present invention. The image recording apparatus 100 is an apparatus which performs color printing on a printing medium 9 exemplified by a long printing paper, by an ink-jet method. The "printing" referred to in the following preferred embodiment includes image recording using the ink-jet method or the like.

As shown in FIG. 1, the image recording apparatus 100 includes a print data generator 4 which generates print data indicating an image to be printed on the printing medium 9, a printing mechanism 5 which performs printing based on the print data while transporting the printing medium 9 in the (−Y) direction (hereinafter referred to as a "transport direction") in FIG. 1, an image acquisition section 6 which captures an image of a pre-printed paper and an image of the printing medium 9 (a printed portion of the printing medium 9) after overprinting is performed thereon, and an image inspection apparatus 7 which inspects a printed image based on an output from the image acquisition section 6.

The printing mechanism 5 includes a transport mechanism 27 and a discharge mechanism 3. The transport mechanism 27 transports the printing medium 9 in the transport direction. The discharge mechanism 3 is an ink-jet head which discharges fine droplets of ink from a plurality of discharge ports arranged in the width direction of the printing medium 9 toward the printing medium 9 which is being transported by the transport mechanism 27. The discharge mechanism 3 is disposed above the transport mechanism 27, and fixed to a frame 25 which is provided on a base 20 so as to extend across the transport mechanism 27.

In the transport mechanism 27, a plurality of rollers 271 each extending in the X direction in FIG. 1 are arranged in the Y direction. A supply section 272 is provided on the (+Y) side of the rollers 271. The supply section 272 holds a roll of the unprinted printing medium 9, and feeds the printing medium 9 out of the roll in the transport direction. A wind-up section 273 is provided on the (−Y) side of the rollers 271. The wind-up section 273 winds up a printed part of the printing medium 9 into a roll shape, and holds the printed part. In the following description, simply by the printing medium 9, the printing medium 9 being transported (that is, the printing medium 9 existing on the plurality of rollers 271) is referred to.

When one of the rollers 271 of the transport mechanism 27 is numbered as a roller 271a, the roller 271a is provided with an encoder 29 which detects the speed of movement of the printing medium 9 in a printing direction. Rotation of a motor of the wind-up section 273 is controlled based on an output from the encoder 29, and thereby the printing medium 9 moves in the (−Y) direction at a constant speed. At this time, a motor included in the supply section 272 applies load (tension) in the direction opposite to a movement direction, that is, in the (+Y) direction, to the printing medium 9, so that the printing medium 9 existing on the rollers 271 smoothly moves without curling.

The image acquisition section 6 is a line camera (digital camera) which is disposed on the downstream side (−Y side) of the discharge mechanism 3 of the printing mechanism 5 with respect to the transport direction in which the printing medium 9 is transported, and which captures an image of a linear area perpendicular to the printing direction, that is, parallel to the X direction.

FIG. 2 is a block diagram showing a configuration of the image inspection apparatus 7. As shown in FIG. 2, the image inspection apparatus 7 includes a memory section 70 which stores various data, a pre-printed element reduction section 71 which reduces influence of a pre-printed element on inspection and generates an inspection object image, and a comparative inspection section 72 which compares the inspection object image obtained by the pre-printed element reduction section 71 with additionally-recorded data and inspects a performance level of a result of overprinting.

The memory section 70 includes a data storage 701 which stores captured image data obtained by the image acquisition section 6 (FIG. 1), a data storage 702 which stores print data obtained from the print data generator 4, and a data storage 703 which stores a result of the inspection performed by the comparative inspection section 72.

Here, the print data generator 4 and the image inspection apparatus 7 can be realized by an information processing apparatus such as a personal computer. The memory section 70 of the image inspection apparatus 7 is realized by a data storage device such as a memory, and the data storages 701 to 703 correspond to separate storage areas in the memory or the like.

The pre-printed element reduction section 71 and the comparative inspection section 72 are realized by an arithmetic processing unit such as a CPU (Central Processing Unit).

<Operation>

Next, with reference to FIGS. 1 and 2, an image inspection operation in the image recording apparatus 100 will be described by using FIGS. 3 and 4.

The roll-shaped printing medium 9 of the image recording apparatus 100 shown in FIG. 1 is a pre-printed paper having a pre-printed element printed thereon in advance. Prior to image inspection, firstly, the printing medium 9 is fed in the transport direction ((−Y) direction). An image (pre-printed paper image) of the pre-printed paper having only the pre-printed element is captured by the image acquisition section 6. Obtained captured image data is inputted to the image inspection apparatus 7. After the image is captured, an image-captured part of the printing medium 9 having the pre-printed element printed thereon is wound up by the wind-up section 273.

The captured image data of the pre-printed paper, which is inputted to the image inspection apparatus 7, is stored in the data storage 701 of the memory section 70.

Then, the discharge mechanism 3 performs ink-jet printing to perform overprinting on the pre-printed paper, based on the print data generated by the print data generator 4. The printing medium 9 after the overprinting is fed in the transport direction. An image (overprinted image) of the overprinted paper is captured by the image acquisition section 6. Obtained captured image data is inputted to the image inspection apparatus 7. The captured image data of the overprinted image, which is inputted to the image inspection apparatus 7, is stored in data storage 701 of the memory section 70.

The captured image data of the pre-printed paper image and the overprinted image, which are stored in the data storage 701, are given to the pre-printed element reduction section 71. By using the captured image data of the pre-printed paper image, the pre-printed element reduction section 71 reduces the pre-printed element included in the captured image data of the overprinted image, and newly prepares an inspection object image.

Here, for the reduction of the pre-printed element in the pre-printed element reduction section 71, two methods will be described.

<Method Using Image Subtraction>

Firstly, a method using image subtraction will be described by using FIG. 3. The part (a) of FIG. 3 shows a pre-printed paper image obtained by capturing an image of a pre-printed paper PP1 on which a ruled line RL, a frame line CL, and a background image within the frame line CL are printed. The brightness of such a pre-printed paper image is adjusted so as to increase a brightness value, and thereby a brightness-adjusted image in which the pre-printed element is reduced as shown in the part (b) of FIG. 3 is obtained.

Here, as a method for the brightness adjustment, the simplest one is a method of adding a predetermined value uniformly to brightness values of respective pixels of the entire pre-printed paper image or multiplying the brightness values of the respective pixels of the entire pre-printed paper image uniformly by a predetermined value. Alternatively, a method is adoptable in which a brightness value of a pixel having a dark color tone (a pixel having a low brightness value) is multiplied by a high coefficient while a brightness value of a pixel having a light color tone (pixel having a high brightness value) is multiplied by a low coefficient, so that the brightness value of the pixel having the dark color tone is more increased.

Figure 3:
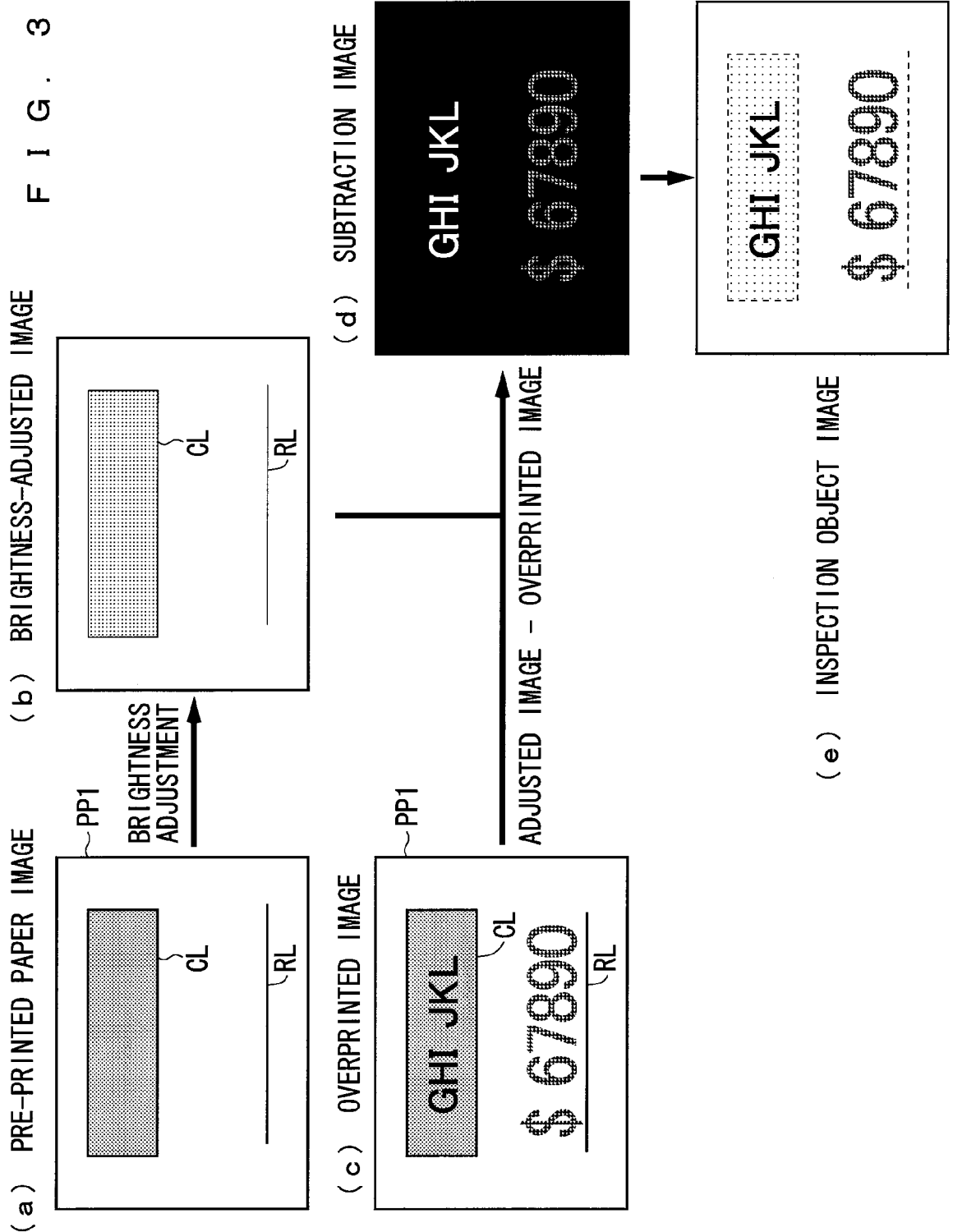
FIG. 3 is a diagram illustrating an exemplary method for reducing influence of the presence of a pre-printed element.
Figure 6:
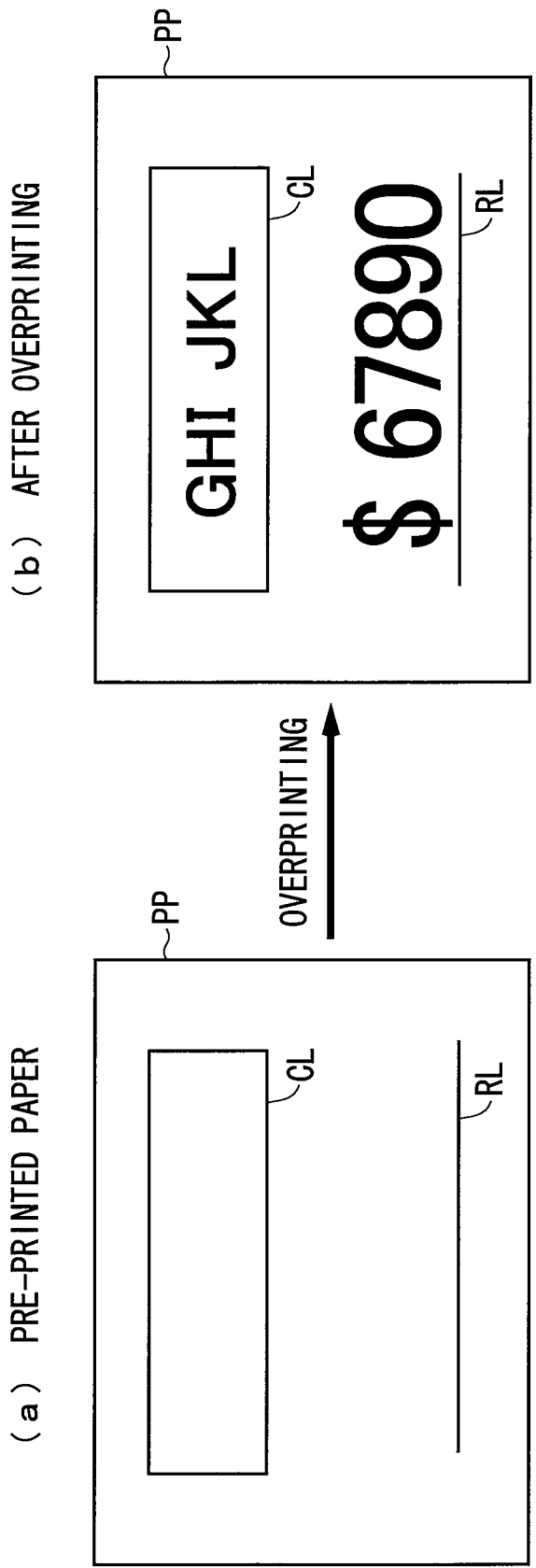
FIG. 6 is a diagram illustrating overprinting.
Figure 8:
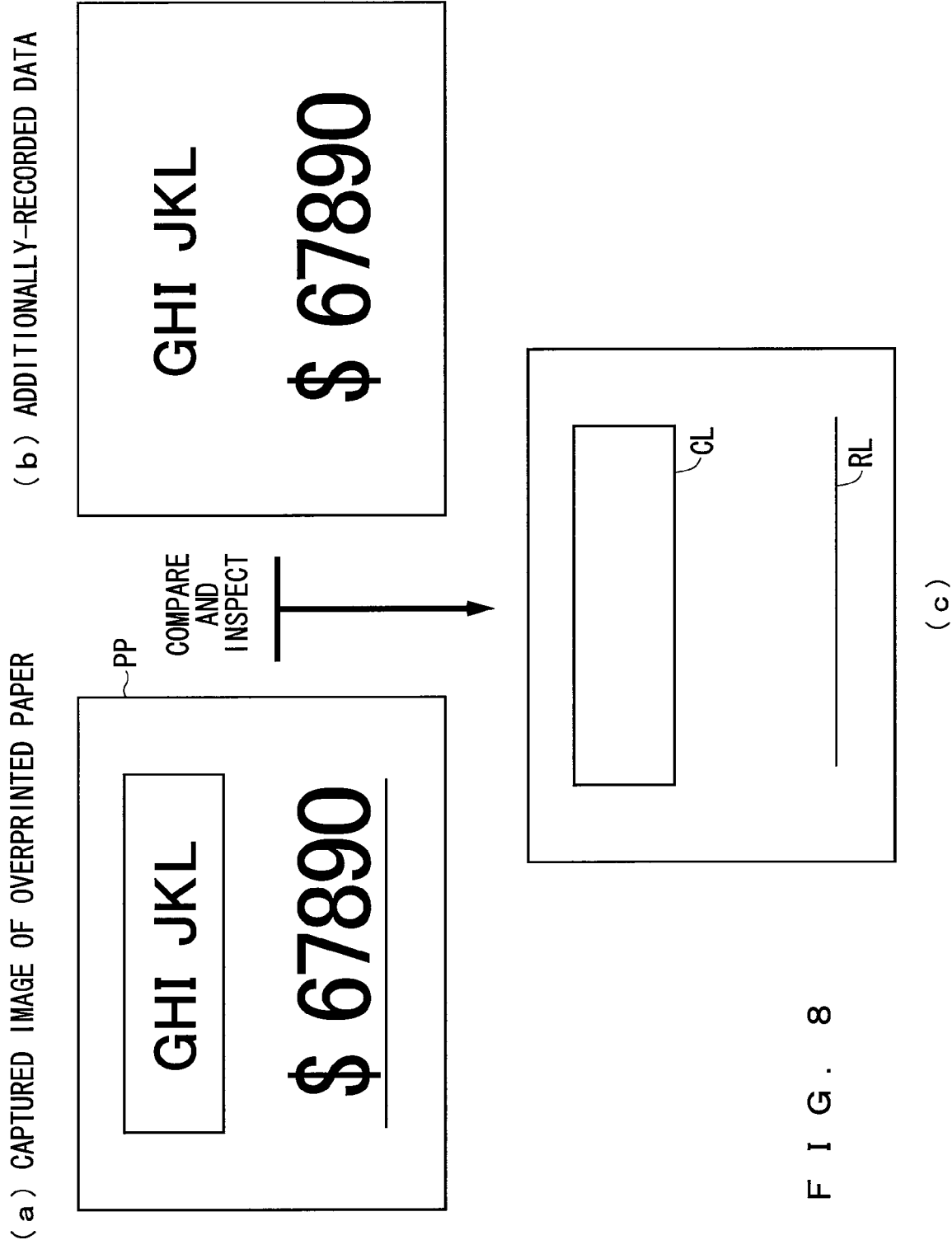
FIG. 8 is a diagram illustrating inspection of an overprinted element.
Figure 9:
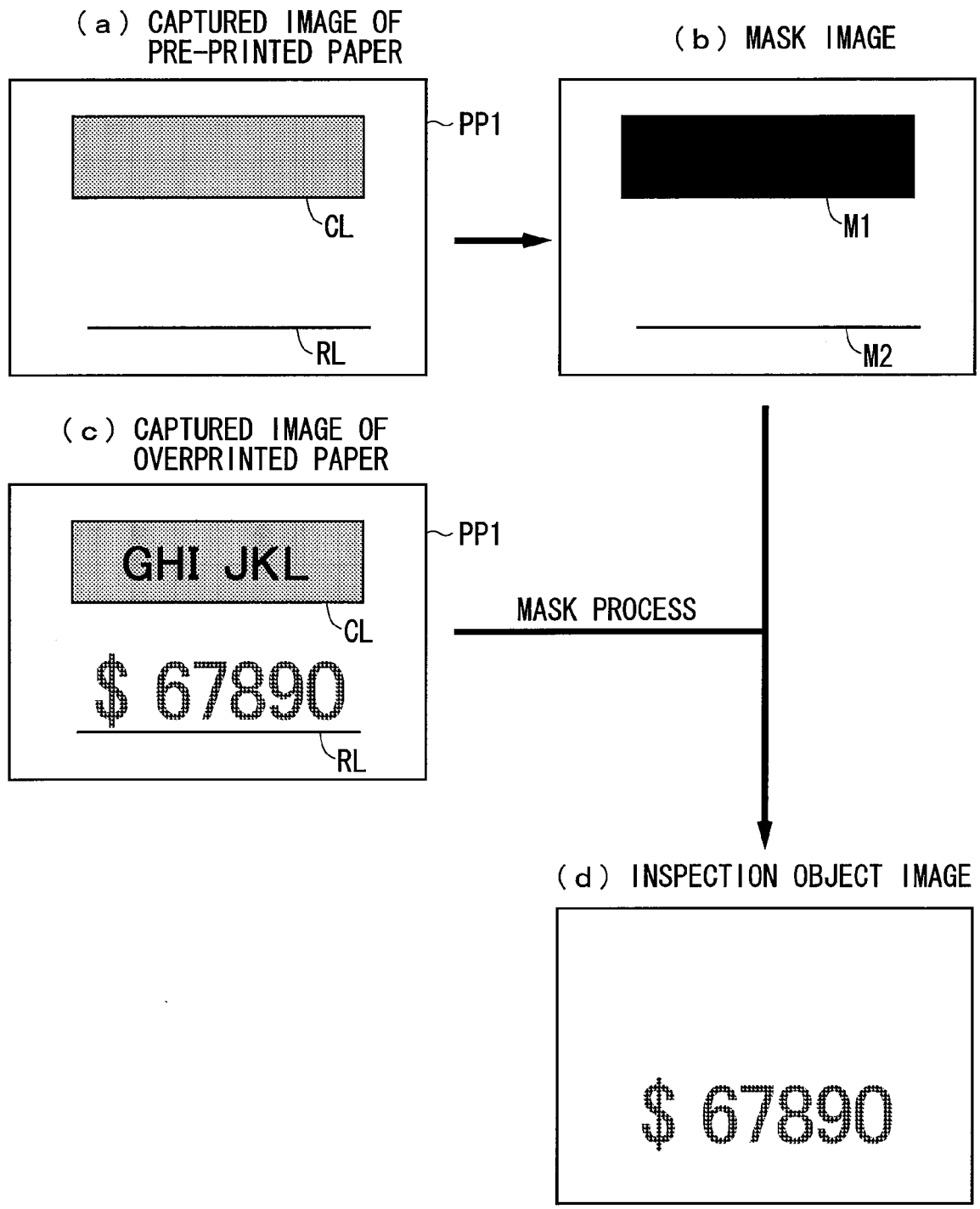
FIG. 9 is a diagram illustrating a case where pre-printed element information is used as mask data.

In the brightness-adjusted image shown in the part (b) of FIG. 3, color tones of the ruled line RL, the frame line CL, and the background portion within the frame line CL are made lighter, and thus a difference between the color tones and a color tone of the paper serving as a base is reduced.

The part (c) of FIG. 3 shows an image obtained after the overprinting is performed within the frame line CL and above the ruled line RL, which is indicated by the captured image data of the overprinted image.

When a brightness value of each pixel of the captured image data of the overprinted image shown in the part (c) of FIG. 3 is subtracted from a brightness value of each corresponding pixel of image data of the brightness-adjusted image shown in the part (b) of FIG. 3, a subtraction image as shown in the part (d) of FIG. 3 is obtained. In the subtraction image, the brightness is lowered as a whole. Particularly, the base is shown in black in reverse because the brightness thereof becomes close to 0. In the overprinted portions, the original brightness of each pixel is reversed. By reversing brightness values in image data of the subtraction image, the inspection object image shown in the part (e) of FIG. 3 is obtained. In the inspection object image, the elements of the frame line CL and the ruled line RL are reduced, and the color tone of the background portion within the frame line CL is made lighter. The pre-printed element is not completely removed, because if the brightness is increased to such an extent that the pre-printed element is completely removed, a lack portion or the like overlapping the pre-printed element is also removed, which may prevent the lack portion from being detected in the subsequent comparative inspection.

Image data of the inspection object image is given to the comparative inspection section 72. The comparative inspection section 72 reads print data (here, the additionally-recorded data) stored in the data storage 702, and compares the print data with the image data of the inspection object image. Then, the comparative inspection section 72 inspects the performance level of the result of the overprinting performed on the pre-printed paper. A result of the inspection is stored in the data storage 703 of the memory section 70.

As described above, in the inspection object image, the elements of the frame line CL and the ruled line RL are reduced, and the color tone of the background portion within the frame line CL is made lighter. This prevents the pre-printed element from being erroneously detected as a lack, a stain, or the like.

<Method Using Image Division>

Next, a method using image division will be described by using FIG. 4. The part (a) of FIG. 4 shows a pre-printed paper image obtained by capturing an image of a pre-printed paper PP1 on which a background image within the frame line CL is printed. The brightness of captured image data of the pre-printed paper is adjusted so as to increase a brightness value, and thereby a brightness-adjusted image in which the pre-printed element is reduced as shown in the part (b) of FIG. 4 is obtained.

The part (c) of FIG. 4 shows an image obtained after the overprinting is performed within the frame line CL and above the ruled line RL, which is indicated by the captured image data of the overprinted image.

Then, a brightness value of each pixel of the captured image data of the overprinted image shown in the part (c) of FIG. 4 is divided by a brightness value of each corresponding pixel of image data of the brightness-adjusted image shown in the part (b) of FIG. 4. Thereby, a quotient for each pixel is obtained as shown in the part (d) of FIG. 4.

As a result of the division, when a pixel in the captured image data of the overprinted image and a corresponding pixel of the image data of the brightness-adjusted image have the same brightness value, the obtained quotient is 1. When a pixel in the captured image data of the overprinted image and a corresponding pixel of the image data of the brightness-adjusted image have different brightness values, the obtained quotient is less than 1. Then, a quotient value in each pixel is multiplied by the brightness value of the pixels representing the original paper portion which corresponds to a base of the overprinted image (or the pre-printed paper image). Thereby, when a pixel of the captured image data of the overprinted image and a corresponding pixel of the image data of the brightness-adjusted image have brightness values close to each other (when the quotient is close to 1), such a pixel corresponds to the pre-printed element whose color tone is made lighter as a result of the brightness adjustment, and the brightness value of such a pixel becomes substantially the same as the brightness value of the base portion. When a pixel of the captured image data of the overprinted image and a corresponding pixel of the image data of the brightness-adjusted image have brightness values greatly different from each other (when the quotient is considerably less than 1), such a pixel corresponds to the overprinted portion, and remains in a dark color. Thus, the inspection object image shown in the part (e) of FIG. 4 is obtained. In the inspection object image, the elements of the frame line CL and the ruled line RL are reduced, and the color tone of the background portion within the frame line CL is made lighter. The pre-printed element is not completely removed, because if the brightness is increased to such an extent that the pre-printed element is completely removed, a lack portion or the like overlapping the pre-printed element is also removed, which may prevent the lack portion from being detected in the subsequent comparative inspection.

Image data of the inspection object image is given to the comparative inspection section 72. The comparative inspection section 72 reads print data (here, the additionally-recorded data indicating the overprinted element) stored in the data storage 702, and compares the print data with the image data of the inspection object image. Then, the comparative inspection section 72 inspects the performance level of the result of the overprinting performed on the pre-printed paper. A result of the inspection is stored in the data storage 703 of the memory section 70.

As described above, in the inspection object image, the elements of the frame line CL and the ruled line RL are reduced, and the color tone of the background portion within the frame line CL is made lighter. This prevents the pre-printed element from being erroneously detected as a lack, a stain, or the like.

<Effect>

In the above-described image recording apparatus 100, the image inspection apparatus 7 reduces the pre-printed element included in the captured image data of the overprinted image by using the captured image data of the pre-printed paper image, and newly prepares the inspection object image. Then, the image inspection apparatus 7 compares the image data of the inspection object image with the additionally-recorded data which indicates the overprinted element. Accordingly, unlike the conventional method, even when the overprinted element exists in a region where the pre-printed element exists, the region can be inspected without masking the region where the pre-printed element exists. Moreover, since the pre-printed element is reduced in the inspection object image, a significant erroneous detection can be prevented in the entire image.

Modified Example 1

In the above-described configuration of the image inspection apparatus 7 of the image recording apparatus 100, the image acquisition section 6 captures an image of the pre-printed paper having only the pre-printed element, and the captured image data is loaded into the image inspection apparatus 7 and used for the reduction of the pre-printed element by the pre-printed element reduction section 71. However, a configuration may also be adopted in which an image scanner exclusively used for scanning the image of the pre-printed paper is used instead of the image acquisition section 6, and pre-printed element information obtained by the image scanner is utilized. The image scanner may be disposed above the transport mechanism 27 of the image recording apparatus 100, or may be provided as a member separate from the image recording apparatus 100 so as to independently scan the pre-printed paper.

FIG. 5 shows a configuration of an image inspection apparatus 7A utilizing pre-printed element information. As shown in FIG. 5, the image inspection apparatus 7A includes, in addition to the configuration of the image inspection apparatus 7 shown in FIG. 2, a pre-printed element information input section 73 such as an image scanner. Then, pre-printed element information, which is inputted via the pre-printed element information input section 73, is stored in the data storage 700 of the memory section 70.

Pre-printed element information obtained by using the pre-printed element information input section 73, which here is scanned image data of the pre-printed paper, is stored in the data storage 700 of the memory section 70.

Then, the discharge mechanism 3 performs ink-jet printing to perform overprinting on the pre-printed paper, based on the print data generated by the print data generator 4. The printing medium 9 after the overprinting is fed in the transport direction. An image of the overprinted paper is captured by the image acquisition section 6. Obtained captured image data is inputted to the image inspection apparatus 7. The captured image data of the overprinted image, which is inputted to the image inspection apparatus 7, is stored in the data storage 701 of the memory section 70.

The pre-printed element information which is stored in the data storage 700 and the captured image data of the overprinted image which is stored in the data storage 701 are given to the pre-printed element reduction section 71. By using the pre-printed element information, the pre-printed element reduction section 71 reduces the pre-printed element included in the captured image data of the overprinted image, and newly prepares an inspection object image. This operation is the same as the operation performed by the pre-printed element reduction section 71 which has been described by using FIGS. 3 and 4.

In the example described above, the pre-printed element information is obtained by the image scanner. However, digital data of the pre-printed element may be directly loaded.

In this manner, the image inspection can be performed more quickly by obtaining the pre-printed element information by a method other than the image capturing performed by the image acquisition section 6.

Modified Example 2

In the above-described image inspection apparatus 7 (or 7A) of the image recording apparatus 100, the pre-printed paper image and the overprinted image are used in the pre-printed element reduction section 71. Overprinting is performed one after another on the roll-shaped printing medium 9 of the image recording apparatus 100, and the printing medium 9 is transported. Along with the transport, the image acquisition section 6 captures one overprinted image after another. The overprinted image is given to the image inspection apparatus 7 (or 7A), and the image inspection is performed. Here, there is a possibility that the overprinted image is captured in a deviated state due to curling of the printing medium 9 or the like. In such a case, the inspection object image is deviated. As a result, when the comparative inspection section 72 compares the data of the inspection object image with the additionally-recorded data indicating the overprinted element, a part of the inspection object image does not coincide with the additionally-recorded data, and the part may be erroneously detected as a lack or the like.

Thus, prior to the process performed by the pre-printed element reduction section 71, a process of preventing a positional misalignment between the pre-printed paper image and the overprinted image may be provided.

In the misalignment prevention process, a method is conceivable in which an image of an alignment mark provided on the printing medium 9 is captured in advance, and positioning is performed such that the alignment mark in the pre-printed paper image and the alignment mark in the overprinted image coincide with each other.

Instead of the positioning using the alignment mark, a method is conceivable in which, when the pre-printed paper image stored in the data storage 701 of the memory section 70 is given to the pre-printed element reduction section 71, the pre-printed paper image is passed through a minimum filter, to increase the width of a deep-colored element of the pre-printed paper image, so that position alignment between the pre-printed paper image and the overprinted image is performed based on the deep-colored element.

Here, the minimum filter is a filter which expands a low brightness portion. By passing the pre-printed paper image through the minimum filter, for example, the widths of the frame line and the ruled line in the pre-printed paper image can be increased, to make the position alignment easier.

While the invention has been shown and described in detail, the foregoing description is in all aspects illustrative and not restrictive. It is therefore understood that numerous modifications and variations can be devised without departing from the scope of the invention.

What is claimed is:

1. An image inspection apparatus which inspects a performance level of a result of overprinting in an overprinted paper obtained after an overprinted element is printed on a pre-printed paper having a pre-printed element printed thereon in advance, said image inspection apparatus comprising:
a pre-printed element reduction section that performs an arithmetic process on image data of said pre-printed paper, which is obtained in advance, and image data of said overprinted paper, and generates an inspection object image in which the pre-printed element included in the image data of said overprinted paper is reduced but is not completely removed; and
a comparative inspection section that receives image data of said inspection object image outputted from said pre-printed element reduction section, and compares the image data of said inspection object image with the image data of said overprinted element, to thereby inspect the performance level of a result of overprinting,
wherein said pre-printed element reduction section includes an adjustment means for reducing a difference between brightness of said pre-printed element and brightness of the paper serving as a base, and generates image data of said pre-printed paper in which said pre-printed element is reduced without said pre-printed element being completely deleted, by increasing brightness of the image data of said pre-printed paper.

2. The image inspection apparatus according to claim 1, wherein said pre-printed element reduction section subtracts the image data of said overprinted paper from the image data of said pre-printed paper, and generates said inspection object image by reversing brightness of image data of an obtained subtraction image.

3. The image inspection apparatus according to claim 1, wherein said pre-printed element reduction section uniformly increases brightness of respective pixels of the image data of said pre-printed paper.

4. The image inspection apparatus according to claim 1, wherein said pre-printed element reduction section multiplies a brightness value of each pixel of the image data of said pre-printed paper by a predetermined coefficient in accordance with the brightness value of the pixel.

5. The image inspection apparatus according to claim 1, wherein said pre-printed element reduction section divides the image data of said overprinted paper by the image data of said pre-printed paper, to calculate a quotient in each pixel, and generates said inspection object image by multiplying said quotient in each pixel by a brightness value of a base.

6. The image inspection apparatus according to claim 1, wherein said pre-printed element reduction section uniformly increases brightness of respective pixels of the image data of said pre-printed paper.

7. The image inspection apparatus according to claim 1, wherein said pre-printed element reduction section multiplies a brightness value of each pixel of the image data of said pre-printed paper by a predetermined coefficient in accordance with the brightness value of the pixel.

8. The image inspection apparatus according to claim 1, wherein prior to the reduction of said pre-printed element by said pre-printed element reduction section, position alignment between the image data of said pre-printed paper and the image data of said overprinted paper is performed.

9. The image inspection apparatus according to claim 1, wherein the image data of said pre-printed paper is obtained by capturing an image of said pre-printed paper by a digital camera.

10. The image inspection apparatus according to claim 1, wherein the image data of said pre-printed paper is obtained by scanning said pre-printed paper by an image scanner.

11. An image inspection method which inspects a performance level of a result of overprinting in an overprinted paper obtained after an overprinted element is printed on a pre-printed paper having a pre-printed element printed thereon in advance, said method comprising steps of:
 (a) performing an arithmetic process on image data of said pre-printed paper, which is obtained in advance, and image data of said overprinted paper, and generating an inspection object image in which the pre-printed element included in the image data of said overprinted paper is reduced but is not completely removed; and
 (b) receiving image data of said inspection object image, and comparing the image data of said inspection object image with the image data of said overprinted element, to thereby inspect the performance level of a result of overprinting,
 wherein said step (a) includes the step of:
 (a-1) reducing said pre-printed element without completely deleting said pre-printed element, by increasing brightness of the image data of said pre-printed paper, to thereby reduce a difference between brightness of said pre-printed element and brightness of the paper as a base.

12. The image inspection method according to claim 11, wherein said step (a) includes the steps of: subtracting the image data of said overprinted paper from the image data of said pre-printed paper, to obtain image data of a subtraction image; and generating said inspection object image by reversing brightness of the image data of said subtraction image.

13. The image inspection method according to claim 11, wherein said step (a-1) includes the step of uniformly increasing brightness of respective pixels of the image data of said pre-printed paper.

14. The image inspection method according to claim 11, wherein said step (a-1) includes the step of multiplying a brightness value of each pixel of the image data of said pre-printed paper by a predetermined coefficient in accordance with the brightness value of the pixel.

15. The image inspection method according to claim 11, wherein said step (a) includes the steps of: dividing the image data of said overprinted paper by the image data of said pre-printed paper, to calculate a quotient in each pixel; and generating said inspection object image by multiplying said quotient in each pixel by a brightness value of a base.

16. The image inspection method according to claim 11, wherein said step (a-1) includes the step of uniformly increasing brightness of respective pixels of the image data of said pre-printed paper.

17. The image inspection method according to claim 11, wherein said step (a-1) includes the step of multiplying a brightness value of each pixel of the image data of said pre-printed paper by a predetermined coefficient in accordance with the brightness value of the pixel.

18. The image inspection method according to claim 11, further comprising prior to said step (a), the step of performing position alignment between the image data of said pre-printed paper and the image data of said overprinted paper.

19. An image recording apparatus which prints an overprinted element on a pre-printed paper having a pre-printed element printed thereon in advance, said image recording apparatus comprising an image inspection apparatus which inspects a performance level of a result of overprinting in an overprinted paper obtained after said overprinted element is printed, said image inspection apparatus comprising:
 a pre-printed element reduction section that performs an arithmetic process on image data of said pre-printed paper, which is obtained in advance, and image data of said overprinted paper, and generates an inspection object image in which the pre-printed element included in the image data of said overprinted paper is reduced but is not completely removed; and
 a comparative inspection section that receives image data of said inspection object image outputted from said pre-printed element reduction section, and compares the image data of said inspection object image with the image data of said overprinted element, to thereby inspect the performance level of a result of overprinting,
 wherein said pre-printed element reduction section includes an adjustment means for reducing a difference between brightness of said pre-printed element and brightness of the paper serving as a base, and generates image data of said pre-printed paper in which said pre-printed element is reduced without said pre-printed element being completely deleted, by increasing brightness of the image data of said pre-printed paper.

20. The image recording apparatus according to claim 19, comprising a digital camera that obtains image data of said pre-printed paper by capturing an image of said pre-printed paper.

21. The image recording apparatus according to 19, comprising an image scanner that obtains image data of said pre-printed paper.

* * * * *